United States Patent Office 3,004,946
Patented Oct. 17, 1961

3,004,946
VINYLIDENE POLYMERS PLASTICIZED WITH NAPHTHENIC ACID DERIVATIVES
Samuel E. Jolly, Ridley Park, Pa., assignor to Sun Oil Company, Philadelphia, Pa., a corporation of New Jersey
No Drawing. Filed Oct. 23, 1958, Ser. No. 769,101
4 Claims. (Cl. 260—31.8)

This invention relates to naphthenic acid derivatives and their use and to methods for preparation of such derivatives.

Petroleum naphthenic acids are complex mixtures of predominantly monocarboxylic, cycloaliphatic acids recoverable from petroleum by known procedures, generally involving formation of alkali metal soaps of the naphthenic acids and extraction of the soaps from the petroleum. Naphthenic acids have a wide range of molecular weights and boiling points, and the fractions recovered from petroleum generally are mixtures of components boiling through a range of at least 75° F., and commonly through a range of at least 150° F. The saponification number of a naphthenic acid fraction is an indication of its average molecular weight, the higher saponification number fractions having lower average molecular weight and vice versa. The present invention contemplates preparation of derivatives of either relatively high molecular weight naphthenic acids having saponification number for example within the range from 120 mg. of KOH per gram to 200 mg. of KOH per gram, or relatively low molecular weight naphthenic acids having saponification number within the range from 200 mg. of KOH per gram to 320 mg. of KOH per gram.

It is known in the art to prepare esters of naphthenic acids with various hydroxyl-containing organic compounds, and such esters are useful to some extent in various applications. However the properties of the prior art naphthenic acid esters are not satisfactory in some uses, for example as primary plasticizers for polyvinyl chloride, and it would be desirable to prepare naphthenic acid derivatives which would have suitable properties for such uses. The present invention provides a novel manner of preparing naphthenic acid derivatives having a particularly wide range of usefulness in different applications.

The process according to the invention involves in one embodiment the contacting of naphthenic acid esters with ozone to produce compositions containing a greater average number of carboxyl groups per molecule than the charge material. It has been found that naphthenic acid derivatives having additional carboxyl groups in the molecule can be prepared, which have increased utility in various uses.

The contacting of naphthenic acid esters with ozone can be carried out under any suitable conditions. Satisfactory results can be obtained at room temperature, but higher temperatures can be employed if desired. The higher temperatures generally result in the production of more highly oxygenated products than the lower temperatures. The production of more highly oxygenated products may be advantageous in providing more carboxyl groups per molecule. On the other hand, it may be disadvantageous in producing excessive amounts in the molecule of other types of oxygen-containing functional groups, such as hydroxyl, aldehyde or keto groups, etc. Generally, it is preferred to employ oxidation temperatures not exceeding 150° F., but higher temperatures can be advantageously employed in some instances. Generally, it will not be desired to employ oxidation temperatures above about 300° F.

Any suitable ozone-containing material can be used as the contacting agent in the process according to the invention. Air and essentially pure oxygen are examples of particularly good gaseous mediums for the contacting agent. A generally preferred manner of preparing the ozone-containing material is to pass air or oxygen or other oxygen-containing gas through a Welsbach ozone generator or other suitable apparatus, thereby to produce a contacting agent containing for example 0.5 to 5 weight percent of ozone.

According to one embodiment of the invention, an ozone-containing material is contacted with esters of petroleum naphthenic acids. Such esters can be prepared from petroleum naphthenic acids and ester-forming organic hydroxyl compounds, according to procedures which are well known in the art. Suitable ester-forming organic hydroxyl compounds for such preparations include for example phenol, alkyl phenols, naphthol, alkyl naphthols, polyhydric phenols, the aliphatic alcohols, such as methanol, ethanol, n-propanol, isopropanol, butanols, hexanols, octanols, decanols, tetradecanols, hexadecanols, allyl alcohol, crotonyl alcohol, oleyl alcohol, etc.; aliphatic polyols, such as ethylene glycol, propanediols, butanediols, pentanediols, hexanediols, octanediols, octadecanediols, glycerol, erythritol, etc.; amino alcohols, such as aminoethanol, diethanolamine, triethanolamine, aminopropanols, aminobutanols, aminooctanols, etc.; aromatic alcohols, such as benzyl alcohol, phenyl propanol, phenyl hexanols, phenyl benzyl alcohol, etc.; alicyclic alcohols, such as cyclohexanol, methyl cyclohexanol, amyl cyclohexanol, phenyl cyclohexanol, naphthenyl alcohol, etc.; heterocyclic alcohols such as furfuryl alcohol, tetrahydrofurfuryl alcohol, etc. Where polyhydric alcohols are employed, the alcohols may be either completely or partially esterified.

The contacting with ozone can be carried out under any suitable pressure, for example atmospheric pressure or elevated pressure up to about 150 p.s.i.g. Higher pressures can be employed if desired, but it will usually be more suitable to employ relatively low pressures. The contacting should be continued until the saponification number has been increased by at least 5 mg. of KOH per gram, and preferably by at least 25 mg. of KOH per gram. Usually, it will not be desired to increase the saponification number by more than 200 mg. of KOH per gram, although greater saponification number increase can be obtained if desired. The time required to obtain the desired increase in saponification number varies according to the contacting conditions, and can be readily determined in the light of the present specification by a person skilled in the art. The rate of contacting of the naphthenic acid ester with the ozone-containing material is not a critical condition, and can be chosen in the light of the present specification by a person skilled in the art, in order to obtain the desired rate of reaction.

The product obtained in the contacting with ozone is a mixture of naphthenic acid esters containing additional carboxyl groups produced by partial oxidation, which groups are for the most part unesterified. These carboxyl groups can subsequently be esterified to produce a completely esterified material. The hydroxyl compound employed in the esterification can be the same used to prepare the charge ester, or it may be a different hydroxyl compound. The esters produced by such subsequent esterification have improved properties for use as plasticizers for vinylidene compounds and for synthetic rubber compositions produced by polymerization of butadiene compounds. Thus, for example, the resulting ester is generally compatible in larger concentrations with polyvinyl chloride than the original ester prior to the contacting with ozone.

In one embodiment, the invention provides vinyl polymers or other vinylidene polymers plasticized with esters obtained by esterifying additional carboxyl groups produced in contacting with ozone. The polymers used include homopolymers, copolymers and interpolymers of ethylenically unsaturated copolymerizable monomers, examples of the latter being vinyl halides, styrene, vinyl naphthalene, acrylic acids, acrylic acid esters such as methyl acrylate and methyl methacrylate, vinylidene halides, acrylonitrile, vinyl acetate, vinyl benzoate, vinyl caproate, vinyl acrylate, vinyl ethyl ether, vinyl butyl ketone, etc. The esters prepared according to the invention can be used as vinylidene polymer plasticizers either alone or in combination with known plasticizers such as dioctyl phthalate, dibutyl phosphate, tricresyl phosphate, and the like. A particular advantage of the esters prepared according to the invention is that they are suitable for use as sole or primary plasticizers in polyvinyl chloride for example, whereas the naphthenic acid esters of the prior art have in general not been sufficiently compatible with polyvinyl chloride to be used as sole or primary plasticizers. The lack of sufficient compatibility has been particularly characteristic of the esters prepared from relatively high molecular weight naphthenic acids.

The proportion of esters to vinylidene polymer in compositions according to this embodiment of the invention is preferably within the approximate range from 20 to 150 parts by weight of esters per 100 parts of polymer; more preferred proportions are those within the range from 40 to 75 parts by weight of esters per 100 parts of polymer.

The plasticized polymer can be prepared in any suitable manner, e.g. by milling, molding, dissolving together in solvents, etc., such techniques being well known in the synthetic resin art.

Esters for use according to the invention as vinylidene polymer plasticizers can be prepared by contacting naphthenic acid material with ozone under conditions as described previously to produce additional carboxyl groups, and esterifying the additional carboxyl groups, as well as any other unesterified carboxyl groups in the molecule. Where naphthenic acid esters are the material contacted with ozone, the product can be hydrolyzed to obtain free naphthenic acids containing additional carboxyl groups, and the latter acids esterified to convert original and additional carboxyl groups. Preferably however the product is directly esterified to convert the additional carboxyl groups. The ultimate ester products obtained by any route within the scope of the invention provide advantages with respect to superior compatibility resulting from the ozone contacting.

The following examples illustrate the invention:

Example I

A mixture of butyl alcohol esters of naturally occurring petroleum naphthenic acids, prepared by esterifying a naphthenic acid fraction with n-butyl alcohol, was contacted with ozone to produce a composition containing additional carboxyl groups. The naphthenic acids employed to prepare the butyl naphthenic mixture conformed in preparation and properties to those sold commercially under the trade-mark "Sunaptic Acids B." Typical properties for such acids are the following: acid number 159 mg. of KOH per gram, distillation range 287–530° F. at 2 mm. Hg (0–98%). The average molecular weight of the acids is about 330, and the average molecular formula is $C_{21}H_{37}O_2$.

The mixture of butyl naphthenates had a saponification number of 136 mg. of KOH per gram, and an acid number of 2 mg. of KOH per gram. The N.P.A. color of the mixture was 4.

Essentially pure oxygen was passed through a Welsbach zone generator to produce an oxygen stream containing about 2 weight percent ozone. This stream was introduced into a body of the butyl naphthenate mixture at room temperature at a rate of about 0.15 standard cubic feet per minute per thousand grams of butyl naphthenates. The introduction was performed at atmospheric pressure, and was continued for 9 hours. The product obtained had saponification number of 177 and acid number of 18, and N.P.A. color of 2. Further contacting with ozone under the same conditions for an additional 12 hours produced a material having saponification number of 220, acid number of 50, and N.P.A. color of 2—.

The products obtained after 9 hours and 21 hours are compositions containing greater average numbers of carboxyl groups per molecule than the original butyl naphthenate mixture. These additional carboxyl groups can be esterified with n-butyl alcohol, or with a different alcohol, to produce compositions comprising esters of polycarboxylic acids. These esters are advantageously employed as plasticizers for vinylidene polymers in the manner described subsequently.

Example II

The butyl naphthenate mixture described in Example I was contacted with ozone at a temperature of 190–210° F. for 35 hours, under conditions otherwise similar to those employed in Example I. The product was too dark to measure on the N.P.A. scale, and had saponification number of 323 and acid number of 118. This product was then esterified with n-butyl alcohol by refluxing with xylene in the presence of a small amount of p-toluene sulfonic acid as esterification catalyst. The resulting products were distilled to obtain a fraction having saponification number of 228 and acid number of 12. This ester fraction has good properties for use as a vinylidene polymer plasticizer.

Example III

The oxidized butyl naphthenates having saponification number of 323, as produced in Example II, were hydrolyzed by digestion with sodium hydroxide at a temperature of about 70° C. The hydrolysis products were extracted with petroleum naphtha to produce a naphtha-soluble fraction, amounting to 50% of the original esters, and having saponification number of 173 and acid number of 155; the naphtha-insoluble fraction amounting to 31% of the original esters and had saponification number of 417 and acid number of 24. In one embodiment, the entire hydrolysis product, the naphtha-insoluble fraction or the naphtha-soluble fraction is esterified with an alcohol in a manner generally similar to that described in Example II to produce esters having good properties for use as vinylidene polymer plasticizers.

Example IV

A plasticized polyvinyl chloride composition was prepared by milling together a polyvinyl chloride composition known by the trade-mark "Geon 101" and the ester composition produced by esterifying with n-butyl alcohol the additional carboxyl groups in the 323 saponification number product produced in Example II by contacting n-butyl naphthenates with ozone. The esters, having saponification number of 201 and acid number of 2, were used in 40 weight percent concentration, based on total plasticized polymer. The esters were found to be fusible, by standard milling technique, with the polyvinyl chloride to produce homogeneous plasticized compositions having satisfactory flexibility, hardness, etc. Slight exuding of plasticizer occurred after two weeks, but the plasticizer was very nearly completely compatible with Geon 101 in 40% concentration. Slightly smaller amounts of plasticizer can be used with complete compatibility, and complete compatibility at 40% concentration and higher can be obtained by preparing the plasticizer from products obtained by oxidation of the original esters to higher saponification numbers.

By way of comparison, the original n-butyl naphthenates, prior to contacting with ozone, do not produce a homogeneous composition in 40% concentration when attempted to be fused with Geon 101. This shows that the esters according to the invention are more compatible with polyvinyl chloride than prior art naphthenic acid esters.

*Example V*

Free naphthenic acids and salts thereof, e.g. ammonium, sodium, potassium salts, etc., can be contacted with ozone, in place of the naphthenic acid esters, to produce increased saponification number, indicating increased carboxyl acidity. Upon esterification of the original and additional carboxyl acidity, the latter provides increased compatibility of the esters with polyvinyl chloride for example. However, the increase in carboxyl acidity and compatibility obtainable by ozone treatment of the acids for example is very small as compared with that obtainable by ozone treatment of the esters, and is usually accompanied by deleterious effects, such as formation of solid deposits, and it is therefore much preferred to employ the esters.

The naphthenic acid materials which are contacted with ozone according to the invention can be derived either from natural naphthenic acids, which can be recovered from petroleum without a separate oxidation step, or from naphthenic acids produced synthetically by the partial oxidation of naphthene hydrocarbons in the petroleum. Processes for liquid phase partial oxidation of petroleum fractions, such as wax or oil or mixtures of oil and wax, in the presence of a metal naphthenate catalyst for example, are well known in the art. Although synthetically produced acids can be employed, such acids differ in structure and properties from natural naphthenic acids, and the latter are preferred starting materials according to the invention.

This application is a continuation-in-part of copending application Serial No. 586,643, filed May 23, 1956, now Patent No. 2,911,433 issued November 3, 1959, wherein ozone treatment of naphthenic acid esters, products obtained thereby, and products of further esterification of the ozone-treated esters are claimed. Application Serial No. 683,956, containing a claim substantially identical with claim 1 of the present application as filed, was filed September 16, 1957 as a continuation-in-part of application Serial No. 586,643. Application Serial No. 683,956 became abandoned on September 25, 1958.

The invention claimed is:
1. As a composition of matter, a vinylidene polymer plasticized with improved plasticizing esters prepared by contacting petroleum naphthenic acid material selected from the group consisting of naphthenic acids, an alkali metal salt of naphthenic acids, an ammonium salt of naphthenic acids, and esters of naphthenic acids with an ester-forming organic hydroxyl compound, said esters of naphthenic acids being adapted for the plasticizing of synthetic organic resins, with ozone at a temperature not exceeding 300° F. to provide increase in saponification number of at least 5 mg. of KOH per gram, and esterifying additional carboxyl groups produced in said contacting with an ester-forming organic hydroxyl compound suitable for producing plasticizing esters adapted for the plasticizing of synthetic organic resins.

2. Composition according to claim 1 wherein the selected naphthenic acid material is said esters of naphthenic acids.

3. Composition according to claim 1 wherein said polymer is polyvinylchloride.

4. As a new composition of matter, polyvinyl chloride plasticized with 20 to 150 parts by weight, per 100 parts of polyvinyl chloride, of esters prepared by contacting butyl alcohol esters of petroleum naphthenic acids with oxygen-containing gas containing 0.5 to 5 weight percent of ozone at a temperature in the range from room temperature to 300° F. and a pressure in the range from atmospheric pressure to 150 p.s.i.g. to increase the saponification number of the esters by 25 to 200 mg. of KOH per gram, and esterifying the additional carboxyl groups produced in the contacting, as well as any other unesterified carboxyl groups in the molecule, with butyl alcohol, thereby to obtain esters having greater compatibility with polyvinyl chloride than the original esters.

References Cited in the file of this patent
UNITED STATES PATENTS

| | | |
|---|---|---|
| 2,005,414 | Dykstra | June 18, 1935 |
| 2,040,882 | Scott | May 19, 1936 |
| 2,049,565 | Holt | Aug. 4, 1936 |
| 2,438,753 | Kellog | Mar. 30, 1948 |
| 2,846,420 | Johnson et al. | Aug. 5, 1958 |

OTHER REFERENCES

Chemical Abstracts, volume 8, pages 3360–1 (1914), Schmitz.